(12) United States Patent
Schreiber et al.

(10) Patent No.: US 12,537,046 B2
(45) Date of Patent: Jan. 27, 2026

(54) RC-TUNED WORDLINE UNDERDRIVE CIRCUIT

(71) Applicant: Advanced Micro Devices, Inc., Santa Clara, CA (US)

(72) Inventors: Russell Schreiber, Austin, TX (US); Clinton Harold Parker, Fort Collins, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 168 days.

(21) Appl. No.: 18/344,812

(22) Filed: Jun. 29, 2023

(65) Prior Publication Data

US 2025/0006246 A1    Jan. 2, 2025

(51) Int. Cl.
*G11C 16/06* (2006.01)
*G11C 11/4076* (2006.01)
*G11C 11/408* (2006.01)
*H03K 19/017* (2006.01)

(52) U.S. Cl.
CPC ...... *G11C 11/4085* (2013.01); *G11C 11/4076* (2013.01); *H03K 19/01742* (2013.01)

(58) Field of Classification Search
CPC ............ G11C 11/4085; G11C 11/4076; H03K 19/01742
USPC ..................................................... 365/185.23
See application file for complete search history.

(56) References Cited

U.S. PATENT DOCUMENTS

| | | | |
|---|---|---|---|
| 5,764,529 A | 6/1998 | Capps et al. | |
| 6,414,862 B1 | 7/2002 | Ogura | |
| 6,628,564 B1 * | 9/2003 | Takita | G11C 11/4074 365/189.11 |
| 7,269,091 B2 * | 9/2007 | Ueda | G11C 11/4085 365/194 |
| 8,451,670 B2 * | 5/2013 | Kolar | G11C 11/419 365/189.14 |
| 8,463,973 B2 | 6/2013 | Naffziger et al. | |
| 9,030,863 B2 * | 5/2015 | Gulati | G11C 8/14 365/210.1 |
| 9,047,933 B2 * | 6/2015 | Pan | G11C 5/148 |
| 9,208,900 B2 * | 12/2015 | Sinangil | G11C 7/12 |

(Continued)

FOREIGN PATENT DOCUMENTS

WO          9814950 A1    4/1998

*Primary Examiner* — Viet Q Nguyen
(74) *Attorney, Agent, or Firm* — Kowert, Hood, Munyon, Rankin & Goetzel, P.C.; Rory D. Rankin

(57) ABSTRACT

An apparatus and method for both reducing power consumption and increasing read access stability of a memory array. An integrated circuit includes a memory array with memory bit cells arranged as multiple rows and multiple columns. The array also includes multiple word line driver circuits configured to generate a corresponding word line for multiple rows. The array includes an underdrive circuit configured to adjust, via a configurable resistor-capacitor circuit, a rate of change of a voltage level of a word line. The configurable resistor-capacitor circuit controls the store data rate of the charging of the selected word line and allows the selected word line to charge to the power supply voltage. The configurable resistor-capacitor circuit controls the rate of charging without creating a direct current path between the power supply voltage and the ground reference level that would increase power consumption.

20 Claims, 8 Drawing Sheets

(56) References Cited

U.S. PATENT DOCUMENTS

| | | |
|---|---|---|
| 9,922,702 B1* | 3/2018 | Shanmugam ......... G11C 11/412 |
| 10,366,734 B2 | 7/2019 | Schaefer et al. |
| 10,679,694 B2* | 6/2020 | Kumar .................. H10B 10/12 |
| 2001/0045815 A1 | 11/2001 | Muratov et al. |
| 2002/0087896 A1 | 7/2002 | Cline et al. |
| 2002/0138778 A1 | 9/2002 | Cole |
| 2003/0021152 A1 | 1/2003 | Le et al. |
| 2003/0065960 A1 | 4/2003 | Rusu |
| 2004/0003301 A1 | 1/2004 | Nguyen |
| 2004/0125514 A1 | 7/2004 | Gunther et al. |
| 2004/0236972 A1 | 11/2004 | Brown et al. |
| 2005/0213412 A1* | 9/2005 | Miki ...................... G11C 5/145 |
| | | 365/226 |
| 2006/0047986 A1 | 3/2006 | Kurts et al. |
| 2008/0104423 A1 | 5/2008 | Boecker et al. |
| 2008/0201591 A1 | 8/2008 | Hu et al. |
| 2009/0116305 A1 | 5/2009 | Son et al. |
| 2009/0167270 A1 | 7/2009 | Lam et al. |
| 2009/0167282 A1 | 7/2009 | Koertzen et al. |
| 2009/0313485 A1 | 12/2009 | Huang |
| 2010/0083009 A1 | 4/2010 | Rotem et al. |
| 2011/0122712 A1* | 5/2011 | Idgunji ................ G11C 11/413 |
| | | 365/189.11 |
| 2011/0154066 A1 | 6/2011 | Ravichandran et al. |
| 2011/0191602 A1 | 8/2011 | Bearden et al. |
| 2012/0069682 A1 | 3/2012 | Joo |
| 2019/0279707 A1* | 9/2019 | Pathak ................. G11C 11/412 |
| 2020/0075090 A1* | 3/2020 | Kumar ................. G11C 11/418 |
| 2023/0410883 A1* | 12/2023 | Tamura ................ G11C 11/413 |

* cited by examiner

RC-TUNED WORDLINE UNDERDRIVE CIRCUIT

BACKGROUND

Description of the Relevant Art

Generally speaking, a variety of semiconductor chips include at least one processor coupled to a memory. The processor executes instructions (or commands) by fetching instructions and data, decoding instructions, executing instructions, and storing results. The processor sends memory access requests to the memory for fetching instructions, fetching data, and storing results of computations. Static random-access memory (SRAM) is commonly used as the memory. The SRAM includes an array of many memory bit cells and surrounding circuitry used for accessing values stored in the array.

The operations of the SRAM increase the power consumption of an integrated circuit. These operations include read accesses, write accesses, pre-charging nodes, selecting columns and rows of the SRAM, driving word lines across the SRAM, and so forth. In addition, stability of the data storage during the read accesses and the write accesses becomes a challenge as operating clock frequencies increase.

In view of the above, methods and systems for efficiently designing memory arrays in semiconductor dies are desired.

Figure 1:
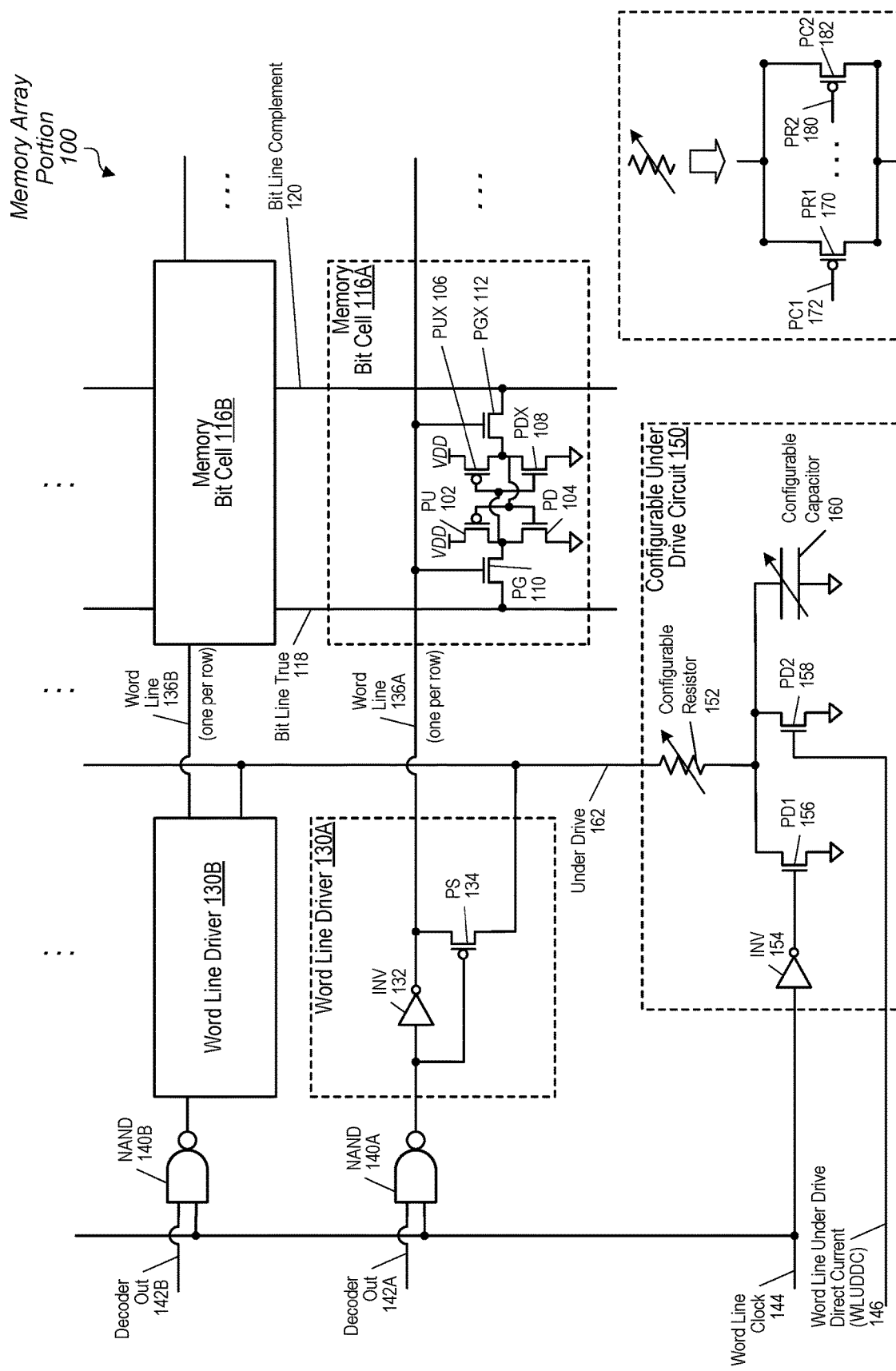
FIG. 1 is a generalized diagram of a memory array portion used in a memory array that reduces power consumption and increases access stability during memory accesses.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods that both reduce power consumption and increase read access stability of a memory array are contemplated. In various implementations, an integrated circuit includes a memory array (or array) and a processor that generates memory access requests targeting data stored in the array. The array utilizes memory bit cells arranged as multiple rows and multiple columns. The array also includes multiple word line driver circuits with each generating a corresponding word line for a particular entry of the array. The array also includes an underdrive circuit that is configured to adjust a rate at which a word line voltage level changes. In one implementation, during an access of the array, the underdrive circuit adjusts, via a configurable resistor-capacitor circuit, a slope (i.e., rate of change) of an increasing voltage level of a word line generated by a selected word line driver circuit. During an access of the array, the underdrive circuit is also configured to adjust, via the configurable resistor-capacitor circuit, a slope of a decreasing voltage level of the word line generated by the selected word line driver circuit. As such, the configurable resistor-capacitor circuit is configured to control the rate of the charging, and subsequent discharging, of a word line and allow the selected word line to charge to the power supply voltage. The configurable resistor-capacitor circuit controls this rate of the charging of the selected word line without creating a direct current path between the power supply voltage and the ground reference level that would increase power consumption. Further details of these techniques that both reduce power consumption and increase read access stability and write access stability of a memory array are provided in the following description of FIGS. 1-8.

Turning now to FIG. 1, a generalized diagram shows a memory array portion 100 used in a memory array that both reduces power consumption and increases access stability during memory accesses. The memory array portion 100 illustrates circuitry within a column of one or more columns of a memory array. The memory array includes multiple memory bit cells, such as memory bit cells 116A-116B, arranged as multiple rows and multiple columns. Each of the memory bit cells 116A-116B has its own corresponding word line (WL). For example, the memory bit cell 116A has the word line 136A, and the memory bit cell 116B has the word line 136B. Each of the word lines 136A-136B is used within a corresponding row of the memory array. The word line drivers 130A-130B generate the word lines 136A-136B using at least the underdrive signal 162 that is generated by the configurable underdrive circuit 150. In various implementations, the memory bit cell 116B is an instantiation of the circuitry in the memory bit cell 116A, and the word line driver 130B is an instantiation of the word line driver 130A. For ease of illustration, other circuitry is not shown such as row decoders, column selection circuitry, clock generation circuitry, sense amplifiers, precharge (or pre-charge) circuitry, keeper circuitry, and latches for storing read operation results and write access data.

Although two rows of the memory array are shown in the memory array portion 100, the memory array includes any number of rows. In various implementations, the circuitry of the configurable underdrive circuit 150 is shared by multiple word line drivers 130A-130B. As described earlier, the word line drivers 130A-130B generate the word lines 136A-136B using at least the underdrive signal 162 that is generated by the configurable underdrive circuit 150. In an implementation, the circuitry of the configurable underdrive circuit 150 is shared by eight multiple word line drivers. In another implementation, the circuitry of the configurable underdrive circuit 150 is shared by another number of word line drivers based on design requirements. It is noted that although the terms "left," "right," "horizontal," "vertical," "row," "column," "top," and "bottom" are used to describe the memory array portion 100, the meaning of the terms can change as the memory array portion 100 is rotated, flipped, or otherwise viewed from a different perspective.

In some implementations, the word lines 136A-136B, the bit line true (BLT) 118, and the bit line complement (BLC) 120 are used for read operations. In other implementations, these signals 136A-136B, 118 and 120 are also used for write operations although the write data latches and write data drivers are not shown for ease of illustration. In other implementations, a separate write word line and separate write bit lines are used for write operations, which increases the number of ports of the memory bit cells 116A-116B. Prior to the read operation, pre-charge circuitry (not shown) charges the BLT 118 and the BLC 120 to the power supply voltage reference level indicated as "VDD." During the read operation, the pre-charge circuitry is disabled to allow the selected memory bit cell, such as memory bit cell 116A, to generate voltage levels on the BLT 118 and the BLC 120.

To select the memory bit cell 116A, the input signal decoder out 142A is asserted while the input signal decoder out 142B is negated. External circuitry, such as row decoders assign Boolean logic levels to the decoder out 142A and the decoder out 142B. As used herein, a Boolean logic high level is also referred to as a logic high level. Similarly, a Boolean logic low level is also referred to as a logic low level. In various implementations, the logic high level is equal to a power supply reference level and the logic low level is equal to a ground reference level.

As used herein, a circuit node or line is "asserted" when the node or line stores a voltage level that enables a transistor that receives the voltage level. For example, an n-type transistor is enabled when the n-type transistor receives a positive non-zero voltage level on its gate terminal that provides a difference equal to or greater than a threshold voltage between the voltage level on its gate terminal and a voltage level on its source terminal. As used herein, the circuit node or line is "negated" when the node or line stores a voltage level that disables a transistor that receives the voltage level. An n-type transistor is disabled when the n-type transistor receives a voltage level on its gate terminal that provides a difference less than a threshold voltage between the voltage level on its gate terminal and a voltage level on its source terminal. Similarly, a p-type transistor is enabled when the p-type transistor receives a voltage level on its gate terminal that provides a difference equal to or greater than a threshold voltage between a voltage level on its source terminal and the voltage level on its gate terminal. The p-type transistor is negated when the p-type transistor receives a voltage level on its gate terminal that provides a difference less than a threshold voltage between a voltage level on its source terminal and the voltage level on its gate terminal.

Each of the Boolean NAND gates 140A-140B generate outputs based on the word line clock 144 and a corresponding one of the input signals decoder out 142A-142B. With each of the input signal decoder out 142A and the word line clock 144 being asserted, the Boolean NAND 140A sends a Boolean logic low value to the word line driver 130A. The word line driver 130A receives this Boolean logic low value by each of the inverter INV 132 and the p-type transistor PS 134. The p-type transistor PS 134 is also connected to the underdrive signal 162. The configurable underdrive circuit 150 generates the underdrive signal 162. In an implementation, the configurable underdrive circuit 150 generates the underdrive signal 162 in a range of 20 to 40 millivolts (mV). In other implementations, the configurable underdrive circuit 150 generates the underdrive signal 162 in another voltage range. The underdrive signal 162 causes the word line 136A to ramp up to VDD at a slower rate, which provides less drive strength for the pass gate transistors PG 110 and PGX 112 of the memory bit cell 116A. By doing so, the configurable underdrive circuit 150 generates the underdrive signal 162 as part of a read assist technique known as word line underdrive (WLUD), which improves the read margins (static noise margins) by reducing the strength of the access transistors (pass gate transistors PG 110 and PGX 112). The word line underdrive technique is also referred to as the word line (or word-line) under-drive (or under drive) technique.

Rather than limit the word line 136A to a voltage less than the power supply VDD during an access (read or write) as is done by convention WLUD techniques, the configurable underdrive circuit 150 allows the word line 136A to reach a voltage level of the power supply VDD during the access of the memory bit cell 116A. By doing so, the configurable underdrive circuit 150 reduces power consumption. In addition, when the signals 136A-136B, 118 and 120 are also used for performing a write operation, the configurable underdrive circuit 150 allowing the word line 136A to reach VDD also improves the ability to perform the write operation. The configurable underdrive circuit 150 allowing the word line 136A to reach VDD also provides faster access time for read operations and write operations. In various implementations, the configurable capacitor 160 of the configurable underdrive circuit 150 is designed to have a size proportional to the capacitance of the word line 136A. Doing so allows the configurable capacitor 160 to charge in a similar amount of time and have a similar behavior across a variety of different size arrays with different number of bit cells per word line.

Between accesses of the memory bit cell 116A, the configurable capacitor 160 is discharged by the pulldown n-type transistor PD1 156 that receives an inverted value of the word line clock 144 from the inverter INV 154. To enable use of the configurable capacitor 160 during an access of the memory bit cell 116A (or any selected memory bit cell), the word line underdrive direct current (WLUDDC) signal 146 is negated with a Boolean logic low value. With WLUDDC signal 146 negated, the n-type pulldown transistor PD2 158 is disabled. With the word line clock 144 being asserted with a Boolean logic high value, the inverter INV 154 sends a Boolean logic low value to the gate terminal of the n-type pulldown transistor PD1 156, which becomes disabled. With each of the n-type pulldown transistors PD1 156 and PD2 158 being disabled, the configurable capacitor 160 is able to be charged during the access of a memory bit cell such as memory bit cell 116A.

In various implementations, the configurable resistor 152 is implemented with multiple p-type transistors such as p-type transistor PR1 170 and PR2 180. Control signal PC1 172 enables and disables the p-type transistor PR1 170. Control signal PC2 182 enables and disables the p-type transistor PR2 180. Although two p-type transistors are shown, in other implementations, any other number of p-type transistors are used based on design requirements. In such implementations, the configurable resistor 152 is implemented with multiple p-type transistors, which provide more predictable than n-type transistors for fast-slow (FS) and slow-fast (SF) semiconductor skewed process corners where one type of the n-type and p-type transistors have faster switching speeds than the other type of transistors. The imbalanced device strengths of the n-type and p-type transistors causes the amount of underdrive to be less predictable in the semiconductor skewed process corners when n-type transistors are used to implement the configurable resistor 152.

The more p-type transistors that are enabled for the configurable resistor 152, the smaller the resistance of the configurable resistor 152 and the faster the configurable capacitor 160 charges during an access of a selected memory bit cell. In contrast, the less p-type transistors that are enabled for the configurable resistor 152, the larger the resistance of the configurable resistor 152 and the slower the configurable capacitor 160 charges during an access of a selected memory bit cell. With each of the configurable resistor 152 and the configurable capacitor 160 being configurable (programmable), the time rate to charge the selected word line, such as word line 136A, to the voltage level of the power supply VDD is also configurable. Therefore, during an access (read or write), the configurable underdrive circuit 150 adjusts, via the configurable resistor 152 and the—configurable capacitor 160, a slope of an increasing voltage level of the selected word line 136A (or a slope of a ramp up voltage of the word line 136A). During an access (read or write), the configurable underdrive circuit 150 adjusts, via the configurable resistor 152 and the—configurable capacitor 160, a slope of a decreasing voltage level of the selected word line 136A (or a slope of a ramp down voltage of the word line 136A).

In some implementations, the settings that provide values for the control signals PC1 172, PC2 182, and so forth that determine a resistance value for the configurable resistor 152 are stored in a fuse array, or a fuse read-only memory (ROM). The fuse ROM utilizes electronic fuses (Efuses) that can be programmed during die characterization in a testing environment, but a continued ability to program is not available in the field. Typically, a fuse is blown at manufacturing time, and its state generally can't be changed once blown. Fuses can be used to encode a variety of types of information such as the settings that determine the resistance value for the configurable resistor 152 and the capacitance for the configurable capacitor 160, manufacturing information, such as a chip serial number, and other information. Besides Efuses, it is possible and contemplated that the fuse ROM uses other fuse technologies such as laser and soft fuses.

It is noted that when the WLUDDC signal 146 is asserted with a Boolean logic high value, the n-type pulldown transistor PD2 158 is enabled and the configurable capacitor 160 does not charge. Enabling the n-type pulldown transistor PD2 158 maintains a ground reference level on each end of the configurable capacitor 160 during accesses of the memory bit cells 116A-116B. In such a case, the underdrive level is set by the configurable resistor 152. Therefore, the WLUDDC signal 146 allows a choice to be made regarding whether to use the configurable capacitor 160 during memory accesses to provide word line underdrive. Before further describing the rates of charging of word lines and the series connected resistor-capacitor circuit (configurable resistor 152 and configurable capacitor 160), a further discussion of the operation of the memory bit cell 116A is provided.

Data storage in the memory bit cell 116A uses a variation of the six-transistor (6T) random access memory (RAM) cell. In other implementations, another one of various types of RAM cells is used to store data. In the illustrated implementation, the p-type transistors PU 102 and PUX 106 are pullup transistors and the n-type transistors PD 104 and PDX 108 are pulldown transistors, and these transistors 102, 104, 106 and 108 form a feedback loop such as back-to-back (or cross coupled) inverters. As used herein, a "transistor" is also referred to as a "semiconductor device" or a "device." The memory array portion 100 uses p-type metal oxide semiconductor (PMOS) field effect transistors FETS (or pfets) in addition to n-type metal oxide semiconductor (NMOS) FETS (or nfets). In some implementations, the devices (or transistors) in the memory array portion 100 are planar devices. In other implementations, the devices (or transistors) in the memory array portion 100 are non-planar devices. Examples of non-planar transistors are tri-gate transistors, fin field effect transistors (FIN FETs), and gate all around (GAA) transistors.

The cross-coupled inverters provided by the devices 102-108 provide data storage as a latching element for two Boolean values. The n-type device PG 110 is a pass gate that provides access to a first value stored by the cross coupled inverters. The first value is stored on the node connected to the drain terminals of the p-type device PU 102 and the n-type device PD 104. The second value is stored on the node connected to the drain terminals of the p-type device PUX 106 and the n-type device PDX 108. The n-type device PGX 112 is a pass gate that provides access to the second value stored by the cross coupled inverters. The first value and the second value are complementary values with respect to one another. When the pass gates (n-type devices 110 and 112) are enabled by the word line (WL) 136A connected to the gate terminals of the pass gates 110 and 112, the bit line true (BTL) 118 and the bit line (BLC) 120 are connected to the storage nodes of the latching element of the memory bit cell 116A.

Figure 2:
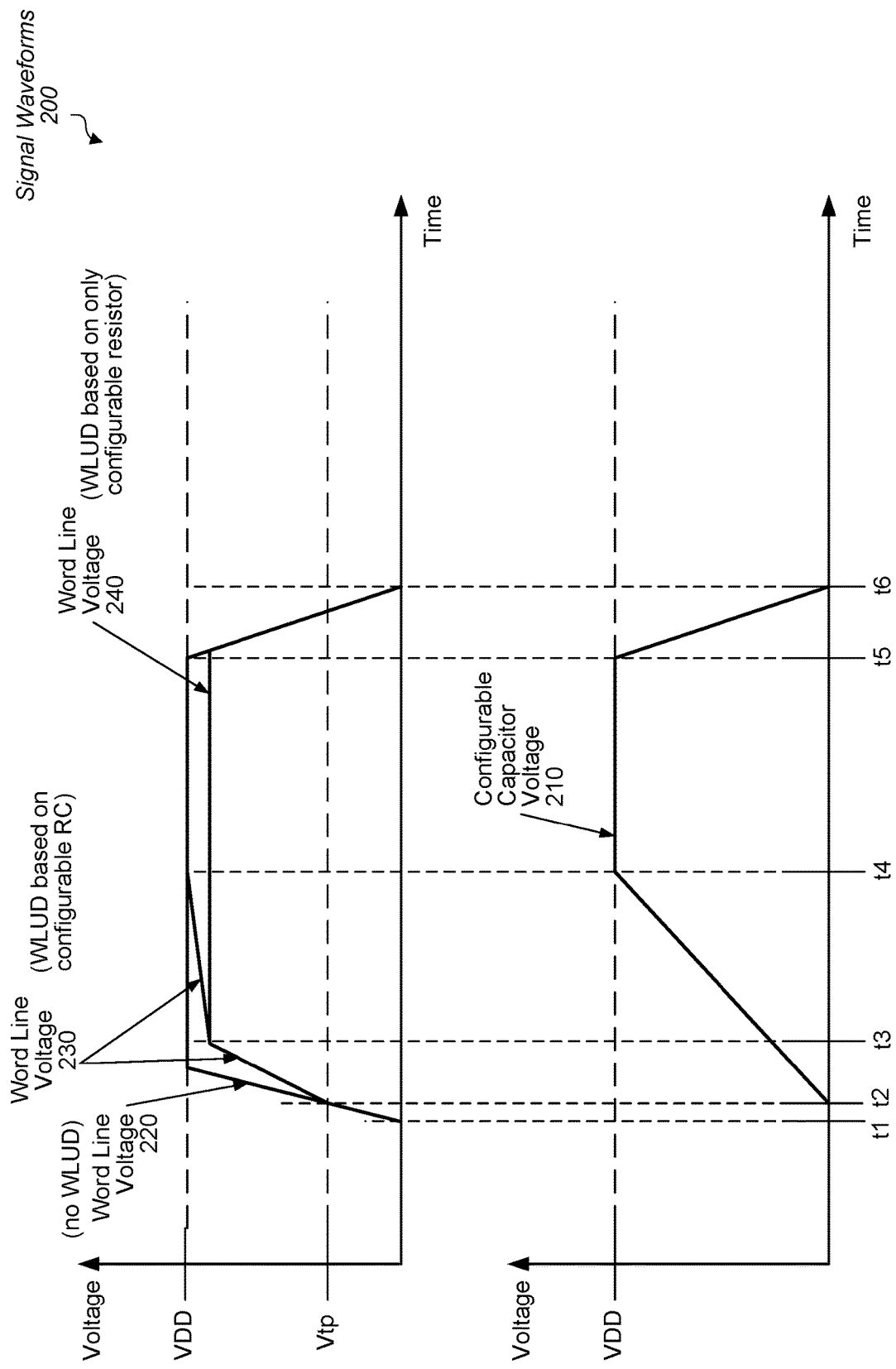
FIG. 2 is a generalized diagram of signal waveforms of voltages at nodes of a memory array that both reduces power consumption and increases access stability during memory accesses.

Referring to FIG. 2, a generalized diagram is shown of signal waveforms 200 of voltages at nodes of a memory array that both reduces power consumption and increases access stability during memory accesses. The signal waveforms 200 illustrate different signal transitions over time such as a configurable capacitor voltage 210 (or voltage 210), and word line voltages 220, 230 and 240. The word line voltage 220 (or voltage 220) is an enabled word line voltage when no word line underdrive (WLUD) technique is used. The word line voltage 230 (or voltage 230) is an enabled word line voltage when a WLUD technique utilizes a configurable (programmable) RC such as a configurable resistor and a configurable capacitor. The word line voltage 240 (or voltage 240) is an enabled word line voltage when a WLUD technique utilizes only a configurable resistor with no configurable capacitor. Referring briefly again to the memory array portion 100 (of FIG. 1), this case occurs when the WLUDDC signal 146 is asserted, which enables the n-type pulldown transistor PD2 158 and maintains a ground reference level on each end of the configurable capacitor 160 during accesses of the memory bit cells 116A-116B.

At the point-in-time t1 (or time t1), any of the word line voltages 220, 230 and 240 begins increasing on a word line node. At time t2, when a WLUD technique is used, either of the voltage 230 and the voltage 240 has a different slope than the voltage 220. If no WLUD technique is used, then the voltage 220 continues to increase at a substantially constant rate as shown until the voltage 220 is equal to the power supply voltage VDD. If a WLUD technique utilizes a configurable resistor, then the level of initial underdrive and the slope of the voltages 230 and 240 between times t2 and t3 is determined by programming a configurable resistance such as the configurable resistor 152 (of FIG. 1).

As described earlier, the voltage 240 is an enabled word line voltage when a WLUD technique utilizes only a configurable a configurable resistor and with no configurable capacitor. Referring briefly to the memory array portion 100 (of FIG. 1), the WLUDDC signal 146 is asserted with a Boolean logic high value, which enables the n-type pull-down transistor PD2 158 and the configurable capacitor 160 does not charge. Enabling the n-type pulldown transistor PD2 158 disconnects the configurable capacitor 160 during accesses of the memory bit cells 116A-116B. In such a case, the underdrive level is set by the configurable resistor 152. If a WLUD technique utilizes a configurable resistor and a configurable capacitor, then the slope of the voltage 230 between times t3 and t4 is determined by programming the configurable resistor 152 and a configurable capacitor such as the capacitor 160 (of FIG. 1).

In addition, if a WLUD technique utilizes a configurable (programmable) RC, then when the voltage 230 (word line) is equal to a threshold voltage of a p-type transistor (Vtp), one or more p-type transistors used to implement the configurable resistor are enabled, and the configurable capacitor begins to charge (as shown at time t2). As a result, the voltage 210 begins to increase from a discharged voltage of 0 volts (0 V). Besides reducing power consumption by utilizing a WLUD technique with a configurable RC, stability of write operations also improve. For example, as bit lines, such as BLT 118 and BLC 120 (of FIG. 1), begin to discharge a sufficient amount to be stable before the selected word line, such as word line 136A (of FIG. 1), is equal to the power supply voltage VDD. At time t4, when the configurable capacitor is fully charged to the voltage level of the power supply VDD, the selected word line also reaches the voltage level of the power supply VDD.

After time t4, the power consumption based on the voltage 230 (word line) versus the voltage 240, is reduced. In addition, when the same word lines and bit lines are used for both read operations and write operations, the stability of the write operation of a corresponding memory bit cell improves. It is possible to have the bit lines discharged sufficiently to be stable before the write word line reaches the power supply voltage level VDD. Allowing the word line voltage 230 to reach VDD reduces power consumption and provides faster access time for read operations and write operations. To lower the bend, or inflection point, of the voltage 230 at time t3 when the WLUD technique uses the configurable (programmable) RC, the configurable resistance (configurable resistor 152 of FIG. 1) is lowered and the configurable capacitance (configurable capacitor 160 of FIG. 1) is increased. The configurable resistance and the configurable capacitance adjust the slope (ramp up slope) of the voltage 230 between times t3 and t4, and adjust the slope (ramp down slope) of the voltage 230 between times t5 and t6.

Regarding the below description of methods 300-400 (of FIGS. 3-4), computer program instructions are processed. In various implementations, the instructions are compiled, fetched from memory, decoded, and executed. In some implementations, one or more instructions are pre-decoded. During the processing of instructions, a variety of types of data are stored in multiple cells of a memory arranged as rows and columns. Examples of the variety of types of data are at least the instructions, pre-decoded instructions, user source data, intermediate result data, final result data, control and status information, and so forth. In some implementations, the memory is a cache in a cache memory subsystem. In other implementations, the memory is a register file or other on-die storage of data.

Figure 3:
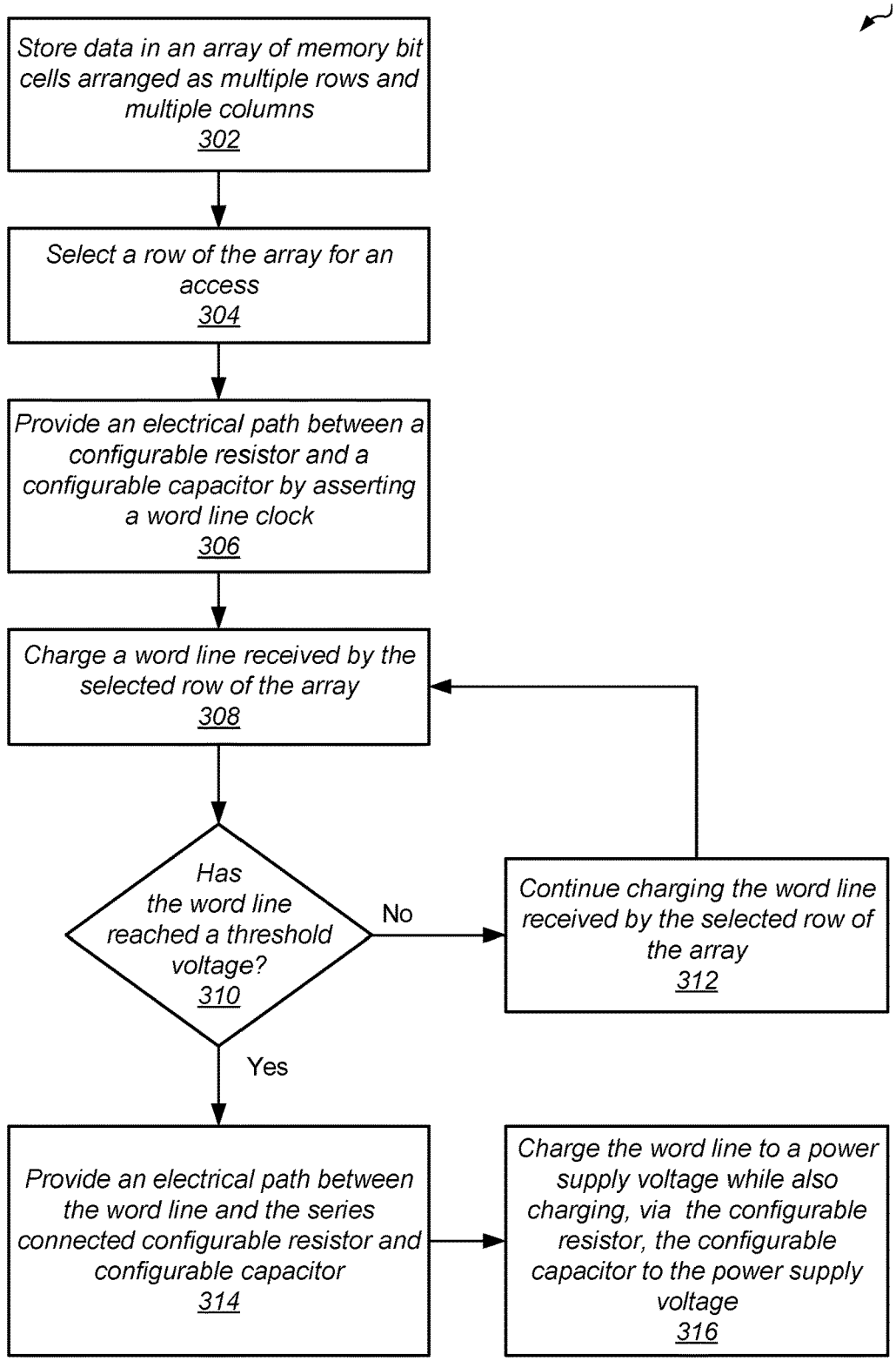
FIG. 3 is a generalized diagram of a method that both reduces power consumption and increases access stability of a memory array.

Referring to FIG. 3, a generalized diagram is shown of a method 300 that both reduces power consumption and increases access stability of a memory array. For purposes of discussion, the steps in this implementation (as well as in FIG. 4) are shown in sequential order. However, in other implementations some steps occur in a different order than shown, some steps are performed concurrently, some steps are combined with other steps, and some steps are absent.

Data is stored in a memory array that includes an array of memory bit cells arranged as a plurality of rows and a plurality of columns (block 302). Row decoder circuitry and word line generating circuitry select a row of the array for an access (block 304). The access can be for a read operation or a write operation. Circuitry of the array provides an electrical path between a configurable resistor and a configurable capacitor by asserting a word line clock (block 306). In an implementation, between accesses of the memory array, the configurable capacitor is discharged by a pulldown n-type transistor that receives an inverted value of the word line clock signal. At the start of an access of the selected row, the word line clock signal is asserted with a Boolean logic high value, and the pulldown n-type transistor receives a Boolean logic low value from the inverter. Therefore, this pulldown n-type transistor is disabled, and no other electrical path exists between the configurable resistor and the configurable capacitor.

A world line generator circuit charges a word line received by the selected row of the array (block 308). If the word line is less than a threshold voltage of a p-type transistor ("no" branch of the conditional block 310), then word line generator circuit continues charging the word line received by the selected row of the array (block 312). If the word line is equal to or greater than the threshold voltage of the p-type transistor ("yes" branch of the conditional block 310), then a p-type transistor becomes enabled and provides an electrical path between the word line and the series connected configurable resistor and configurable capacitor (configurable resistor-capacitor circuit) (block 314).

In an implementation, the p-type transistor receives an inverted value of the word line on its gate terminal, has a source terminal connected to the word line, and has a drain terminal connected to an end of the configurable resistor. The provided electrical path allows the configurable resistor-capacitor circuit to adjust the generation of the word line. The word line generator circuit charges the word line to a power supply voltage while also charging, via the configurable resistor (and the p-type transistor), the configurable capacitor to the power supply voltage (block 316). Therefore, the configurable resistor-capacitor circuit enables adjustments to the slope of an increasing voltage level of the word line (or the slope of a ramp up voltage of the word line) generated by the word line generator circuit. Allowing the word line to reach the power supply voltage level, reduces power consumption and provides faster access time for read operations and write operations. When the word line signals and the bit line signals are also used for performing a write operation, the circuitry of the array allowing the selected word line to reach the power supply voltage also improves the ability to perform the write operation. Stability of write operations also improve. For example, the bit lines are able to discharge a sufficient amount to be stable before the selected word line is equal to the power supply voltage.

Figure 4:
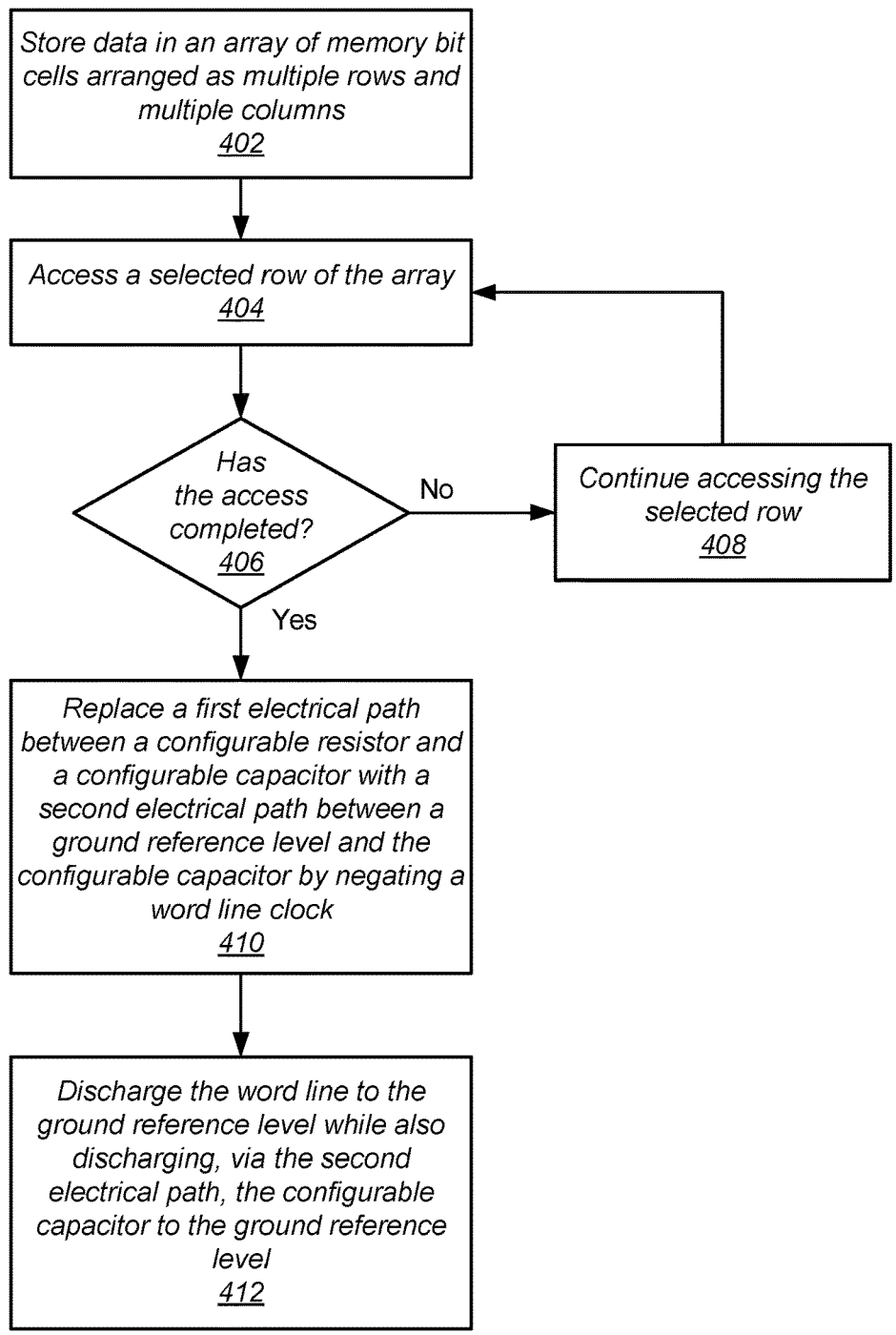
FIG. 4 is a generalized diagram of a method that both reduces power consumption and increases access stability of a memory array.

Referring to FIG. 4, a generalized diagram is shown of a method 400 that both reduces power consumption and increases access stability of a memory array. Data is stored in a memory array that includes an array of memory bit cells arranged as a plurality of rows and a plurality of columns (block 402). Row decoder circuitry and word line generating circuitry select a row of the array for an access. A word line generator circuit provides an asserted word line for the selected row. The memory bit cells of the selected row are accessed by circuitry of the memory array (block 404). The type of access can be a read access or a write access. During the access, the word line has a voltage level equal to a power supply voltage level. Allowing the word line to reach the power supply voltage level, reduces power consumption, provides faster access time for read operations and write operations, and increases stability of write operations.

If the access has not yet completed ("no" branch of the conditional block 406), then the circuitry of the memory array continues accessing the selected row (block 408). If the access has completed ("yes" branch of the conditional block 406), then the circuitry of the memory array replaces a first electrical path between a configurable resistor and a configurable capacitor with a second electrical path between a ground reference level and the configurable capacitor by negating a word line clock (block 410).

In an implementation, a pulldown n-type transistor receives, on its gate terminal, an inverted value of the word line clock signal. The drain terminal of the pulldown n-type transistor is connected to an end of the configurable capacitor, and the source terminal is connected to the ground reference level. When the access has completed, the word line clock signal is negated, and the pulldown n-type transistor is enabled by the inverted value of the work line clock signal. The circuitry of the memory array discharges the word line to the ground reference level while also discharging, via the second electrical path, the configurable capacitor to the ground reference level (block 412). The word line generator circuit discharges the word line, and the enabled pulldown n-type transistor discharges the configurable capacitor.

Figure 5:
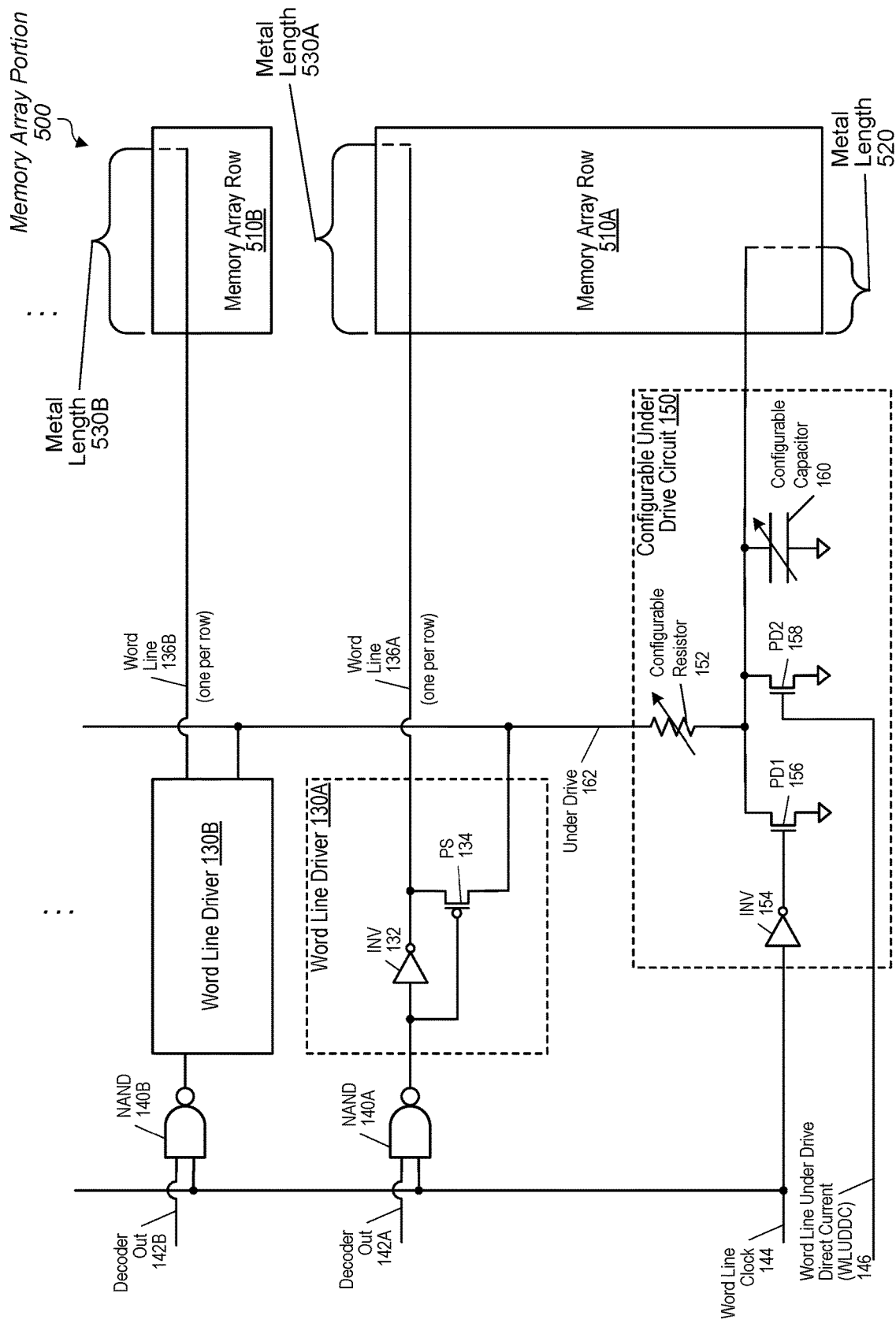
FIG. 5 is a generalized diagram of a memory array portion used in a memory array that both reduces power consumption and increases access stability during memory accesses.

Turning now to FIG. 5, a generalized diagram is shown of a memory array portion 500 used in a memory array that both reduces power consumption and increases access stability. Signals and circuitry described earlier are numbered identically. The type of access performed by the memory array portion 500 can be a read access or a write access. As shown, the word line 136A is routed from the word line driver 130A to the memory array row 510A that includes multiple memory bit cells. Similarly, the word line 136B is routed from the word line driver 130B to the memory array row 510B that includes multiple memory bit cells. The word line 136A has a metal length 530A, and the word line 136B has a metal length 530B. In various implementations, metal length 530A equals the metal length 530B. In other words, each of the word lines 136A and 136B has a same capacitance due to the use of a same metal layer, a same metal width, a same metal thickness, and a same metal length such as the metal lengths 530A and 530B. In some implementations, the metal lengths 530A and 530B are measured from the word line drivers 130A-130B to the far ends of the word lines 136A-136B. In another implementation, the metal lengths 530A and 530B are the lengths of the word lines 136A-136B that traverse through the memory array rows 510A-510B.

The configurable capacitor 160 (or capacitor 160) is constructed partially with a metal route with a metal length 520. In some implementations, the metal length 520 is measured from the configurable underdrive circuit 150 to the far end of the metal route that is connected to the capacitor 160 with the near end. In other implementations, the metal length 520 is the length of this metal route that traverses through the memory array row 510A. In some implementations, this metal route utilizes an upper metal layer so as to be routed above active devices and not interfere with circuit connections in the memory array row 510A. In an implementation, based on comparisons of the metal widths, metal thicknesses, and the metal layers used for this route and the word line 136A, the metal length 520 is selected to provide a particular ratio of metal length 520 to metal length 530A. In another implementation, the metal length 520 is selected to provide a particular capacitance that allows the capacitor 160 to be smaller and consume less on-die area. In other words, a metal route that traverses over the memory array row 510A has the metal length 520 that is a given fraction of the metal length 530A of the portion of the word line 136A that traverses over the memory array row 510A.

Figure 6:
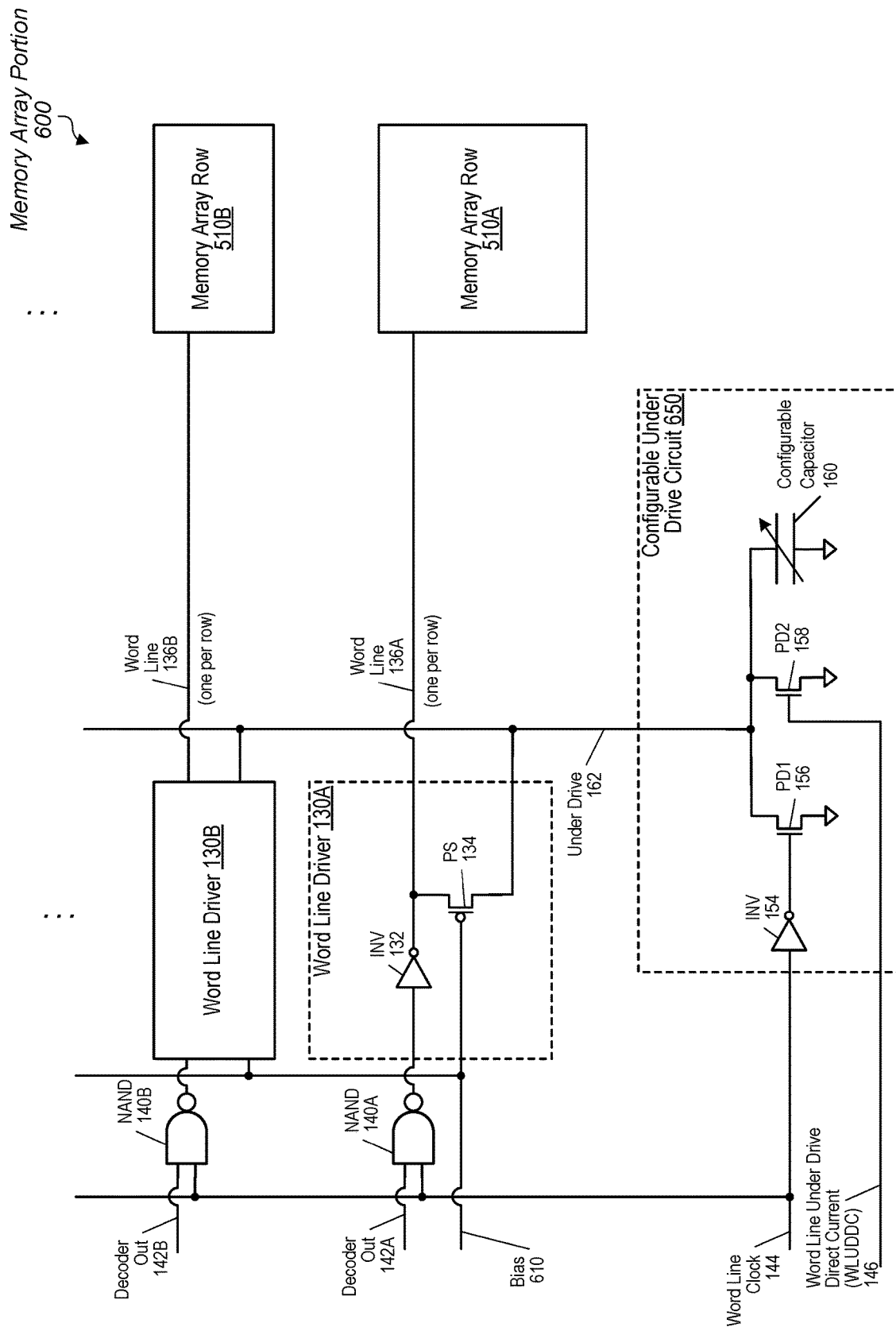
FIG. 6 is a generalized diagram of a memory array portion used in a memory array that both reduces power consumption and increases access stability during memory accesses.

Referring now to FIG. 6, a generalized diagram is shown of a memory array portion 600 used in a memory array that both reduces power consumption and increases access stability. Signals and circuitry described earlier are numbered identically. The type of access performed by the memory array portion 600 can be a read access or a write access. As shown, the configurable underdrive circuit 650 does not include the configurable resistor 152. Therefore, the configurable underdrive circuit 650 consumes less on-die area than the configurable underdrive circuit 150 (of FIG. 1). In addition, the word line driver 130A receives an input signal bias 610. The gate terminal of the p-type transistor PS 134 receives the input signal bias 610. In an implementation, the input signal bias 610 is an analog bias voltage that controls the current flow through the p-type transistor PS 134. When the input signal bias 610 is greater than 0V, the initial voltage ramping up of the word line 136A is faster than when the gate terminal of the p-type transistor PS 134 receives the output of the NAND 140A. The p-type transistor PS 134 is not enabled until the word line 136A is greater than the sum of the input signal bias 610 and the threshold voltage of the p-type transistor PS 134.

Figure 7:
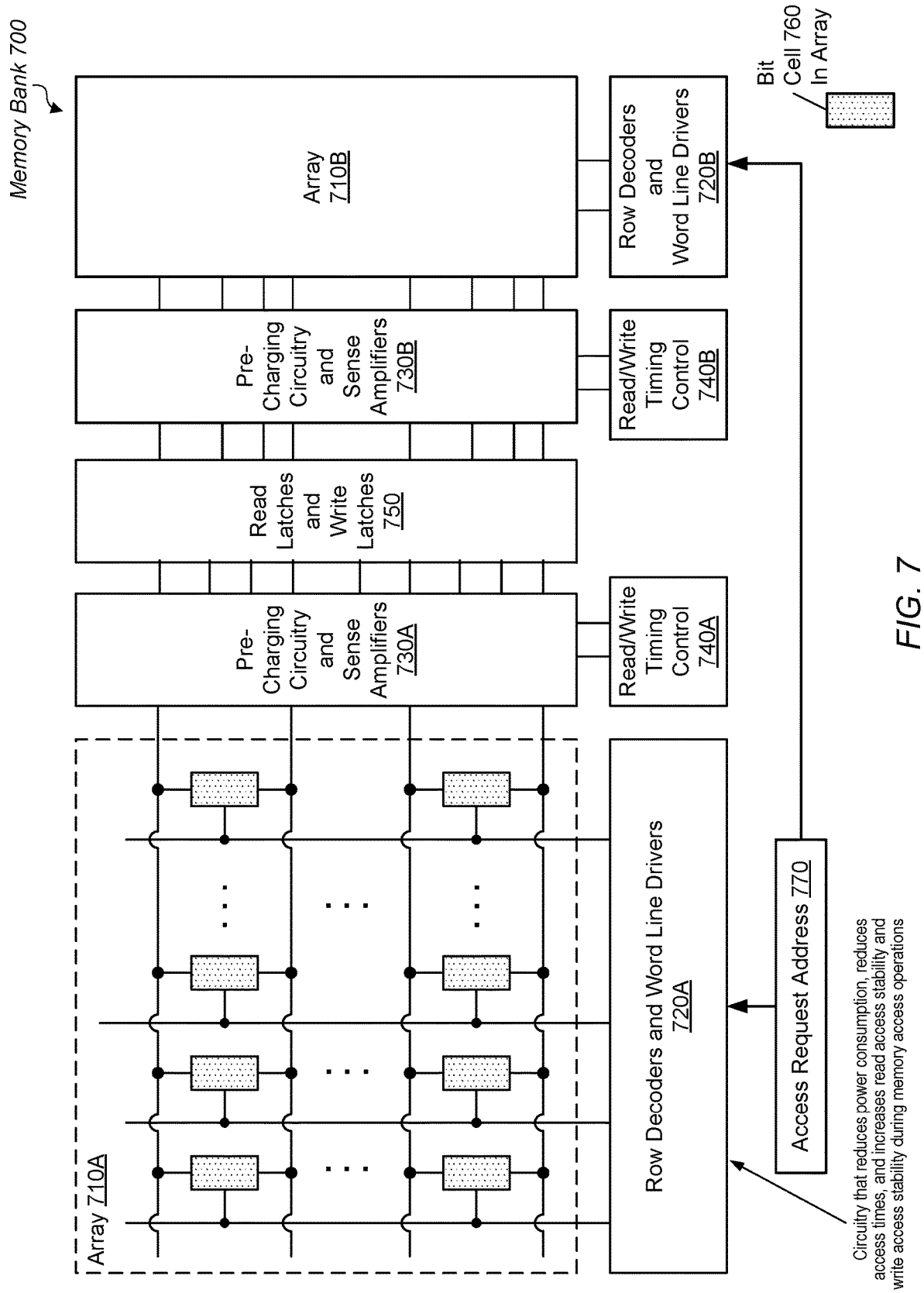
FIG. 7 is a generalized diagram of a memory bank that both reduces power consumption and increases access stability of a memory array.

Turning now to FIG. 7, a generalized block diagram is shown of a memory bank 700 that both reduces power consumption and increases access stability of a memory array. In various implementations, a memory is organized as multiple memory banks, and a memory macro block includes both a left bank and a right bank. In some implementations, the bank 700 is one of the left bank or the right bank of the memory macro block. As described earlier, the terms "left," "right," "horizontal," "vertical," "top," and "bottom" are used to describe the memory banks, it is noted that the meaning of the terms can change as the memory bank 700 is rotated or flipped. As shown, the memory bank 700 includes arrays 710A-710B, row decoders and word line drivers blocks 720A-720B (or blocks 720A-720B), precharging circuitry and sense amplifiers blocks 730A-730B (or blocks 730A-730B) between the arrays 710A-710B, read and write timing control circuitry blocks 740A-740B (or blocks 740A-740B), and read latches and write latches in block 750. It is noted that, in some implementations, multiple banks are accessed concurrently in a same clock cycle or a same pipeline stage. The access includes one of a read access and a write access. In such implementations, bank address decoders select the corresponding banks to access.

In various implementations, circuitry of each of the arrays 710A-710B and blocks 720A-720B, 730A-730B, 740A-740B and 750 in the memory bank 700 is communicatively coupled to another one of the blocks. For example, direct connections are used wherein routing occurs through another block. Alternatively, staging of signals is done in an intermediate block. In various implementations, each of the arrays 710A-710B includes multiple memory bit cells 760 arranged in a tiled format. Here, the rows are aligned with the tracks used for the routing of the word lines of the array such as in the vertical direction in the illustrated implementation. The columns are aligned with the tracks used for the routing of the bit lines of the array such as in the horizontal direction in the illustrated implementation.

In various implementations, the block 730B is an instantiated copy of the block 730A, the array 710B is an instantiated copy of the array 710A, and the block 720B is an instantiated copy of the block 720A. In various implementations, the circuitry of the blocks 720A-720B includes the circuitry of one or more of the memory array portions 100, 500, and 600 (of FIGS. 1 and 5-6). Therefore, the blocks 720A-720B include circuitry that that both reduces power consumption and increases access stability during memory accesses.

The circuitry of the row decoders and word line drivers in blocks 720A-720B receive address information corresponding to an access request. For example, each of the blocks 720A-720B receives the information provided by the access request address 770. Each one of the blocks 720A-720B selects a particular row, or entry, of the multiple rows in an associated one of the arrays 710A-710B. In some implementations, the blocks 720A-720B use an index portion of the address 770 for selecting a given row, or entry, in an associated one of the arrays 710A-710B. Each row, or entry, stores one or more memory lines.

In the implementation shown, the rows, or entries, in the arrays 710A-710B are arranged in a vertical orientation. However, in other implementations, a horizontal orientation is used for storage of the memory lines. For write access requests, the write latches are located in block 750. The write data is driven into the arrays 710A-710B. The timing control circuitry of the blocks 740A-740B updates the write latches with new data in block 750 and sets up the write word line driver logic. The write data is written into a row of bit cells that is selected by an associated one of the blocks 720A-720B. In some implementations, pre-charge circuitry is included in block 750.

For read access requests, the block 750 is used to pre-charge the read bit lines routed to the arrays 710A-710B. The timing circuitry in the timing control circuitry of the blocks 740A-740B is used for pre-charging and setting up the circuitry in the blocks 730A-730B. The timing control circuitry of the blocks 740A-740B sets up the read word line driver logic. One of the row decoders of the blocks 720A-720B selects a row to read out data, which will be provided on read bit lines that are sensed by the sense amplifiers. The read latches capture the read data.

Figure 8:
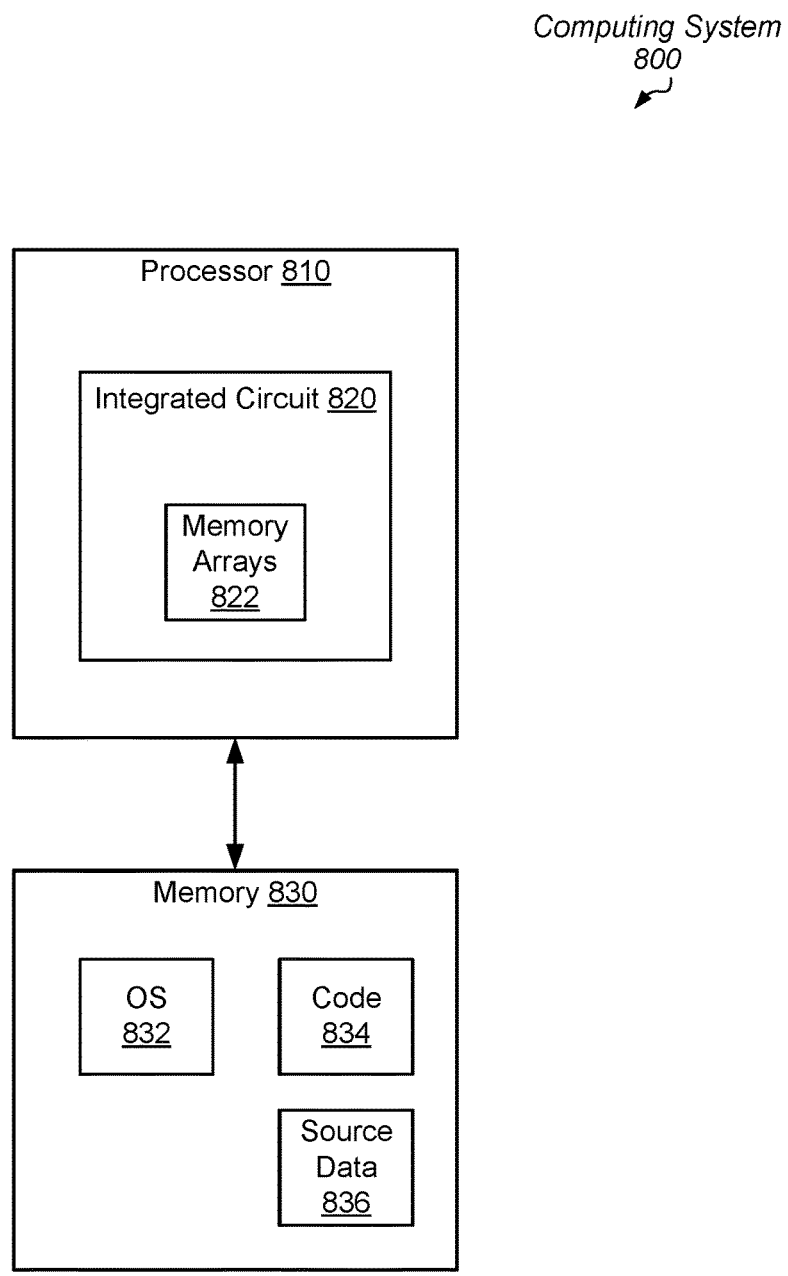
FIG. 8 is a generalized diagram of a computing system that both reduces power consumption and increases access stability of a memory array.

Referring to FIG. 8, a generalized block diagram is shown of a computing system 800 that both reduces power consumption and increases access stability of a memory array. The computing system 800 includes the processor 810 and the memory 830. Interfaces, such as a memory controller, a bus, or a communication fabric, one or more phased locked loops (PLLs) and other clock generation circuitry, power management circuitry, and so forth, are not shown for ease of illustration. It is understood that in other implementations, the computing system 800 includes one or more of other processors of a same type or a different type than processor 810, one or more peripheral devices, a network interface, one or more other memory devices, and so forth. In some implementations, the functionality of the computing system 800 is incorporated on a system on chip (SoC). In other implementations, the functionality of the computing system 800 is incorporated on a peripheral card inserted in a motherboard. The computing system 800 is used in any of a variety of computing devices such as a desktop computer, a tablet computer, a laptop, a smartphone, a smartwatch, a gaming console, a personal assistant device, and so forth.

The processor 810 includes hardware such as circuitry. For example, the processor 810 includes at least one integrated circuit 820. The integrated circuit 820 includes memory arrays 822 where one or more of these memory arrays 822 includes the circuitry of one or more of the memory array portions 100, 500, and 600 (of FIGS. 1 and 5-6). Therefore, the one or more of these memory arrays 822 includes circuitry that both reduces power consumption and increases read access stability during memory accesses. In some implementations, the processor 810 includes one or more processor cores capable of general-purpose data processing, and an associated cache memory subsystem. In such an implementation, the processor 810 is a central processing unit (CPU). In another implementation, the processing cores are compute circuits, each with a parallel data microarchitecture with multiple parallel execution lanes and an associated data storage buffer. In various implementations, the processor 810 is a graphics processing unit (GPU), a digital signal processor (DSP), or otherwise.

In some implementations, the memory 830 includes one or more of a hard disk drive, a solid-state disk, other types of flash memory, a portable solid-state drive, a tape drive and so on. The memory 830 stores an operating system (OS) 832, one or more applications represented by code 834, and at least source data 836. Memory 830 is also capable of storing intermediate result data and final result data generated by the processor 810 when executing a particular application of code 834. Although a single operating system 832 and a single instance of code 834 and source data 836 are shown, in other implementations, another number of these software components are stored in memory 830. The operating system 832 includes instructions for initiating the boot up of the processor 810, assigning tasks to hardware circuitry, managing resources of the computing system 800 and hosting one or more virtual environments.

Each of the processor 810 and the memory 830 includes interface circuitry for communicating with one another as well as any other hardware components included in the computing system 800. The interface circuitry includes queues for servicing memory requests and memory responses, and control circuitry for communicating with one another based on particular communication protocols. The communication protocols determine a variety of parameters such as supply voltage levels, power-performance states that determine an operating supply voltage and an operating clock frequency, a data rate, one or more burst modes, and so on.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVER, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
   an array of memory bit cells arranged as a plurality of rows and a plurality of columns, each configured to store data;
   a plurality of word line driver circuits, each configured to generate a corresponding word line for the plurality of rows of the array of memory bit cells; and
   an underdrive circuit configured to adjust, via a configurable resistor-capacitor circuit, a rate of change in a voltage level of a given word line generated by a word line driver circuit of the plurality of word line driver circuits.

2. The integrated circuit as recited in claim 1, wherein one or more of the plurality of word line driver circuits comprises a p-type transistor comprising:
   a source terminal connected to a corresponding word line;
   a gate terminal configured to receive an analog bias input signal; and
   a drain terminal connected to an end of a capacitor of the configurable resistor-capacitor circuit of the underdrive circuit.

3. The integrated circuit as recited in claim 1, wherein one or more of the plurality of word line driver circuits comprises a p-type transistor comprising:
   a source terminal connected to a corresponding word line;
   a gate terminal configured to receive an inverted value of the corresponding word line; and
   a drain terminal connected to the configurable resistor-capacitor circuit of the underdrive circuit.

4. The integrated circuit as recited in claim 3, wherein the underdrive circuit is further configured to disconnect a capacitor of the configurable resistor-capacitor circuit during accesses of the array of memory bit cells.

5. The integrated circuit as recited in claim 1, wherein the underdrive circuit is further configured to discharge a capacitor of the configurable resistor-capacitor circuit between accesses of the array of memory bit cells.

6. The integrated circuit as recited in claim 5, wherein the underdrive circuit is further configured to disable, via a word line clock signal during an access of the array of memory bit cells, an n-type pulldown transistor utilized to discharge the capacitor.

7. The integrated circuit as recited in claim 1, wherein an end of a capacitor of the configurable resistor-capacitor circuit is connected to a metal route, wherein a portion of the metal route that traverses the array of memory bit cells has a length that is less than a length of the given word line that traverses the array of memory bit cells.

8. A method comprising:
   storing data in an array of memory bit cells arranged as a plurality of rows and a plurality of columns, each configured to store data;
   generating, by each of a plurality of word line driver circuits, a corresponding word line for the plurality of rows of the array of memory bit cells; and
   adjusting, via a configurable resistor-capacitor circuit of an underdrive circuit coupled to the plurality of word line driver circuits, a rate of change in a voltage level of a given word line generated by a given word line driver circuit of the plurality of word line driver circuits.

9. The method as recited in claim 8, further comprising:
   generating a corresponding word line of the given word line driver circuit by a source terminal of a p-type transistor of the given word line driver circuit;
   receiving an analog bias input signal by a gate terminal of the p-type transistor; and
   charging a configurable capacitor by a drain terminal of the p-type transistor.

10. The method as recited in claim 8, further comprising:
    generating a corresponding word line of the given word line driver circuit by a source terminal of a p-type transistor of the given word line driver circuit;
    receiving an inverted value of the corresponding word line by a gate terminal of the p-type transistor; and
    charging a configurable capacitor of the configurable resistor-capacitor circuit via a drain terminal of the p-type transistor and a configurable resistor of the configurable resistor-capacitor circuit.

11. The method as recited in claim 10, further comprising disconnecting, by the underdrive circuit, a capacitor of the configurable resistor-capacitor circuit during accesses of the array of memory bit cells.

12. The method as recited in claim 8, further comprising discharging, by the underdrive circuit, a capacitor of the configurable resistor-capacitor circuit between accesses of the array of memory bit cells.

13. The method as recited in claim 12, further comprising disabling, via a word line clock signal during an access of the array of memory bit cells, an n-type pulldown transistor utilized to discharge the capacitor.

14. The method as recited in claim 8, wherein an end of a capacitor of the configurable resistor-capacitor circuit is connected to a metal route, wherein a portion of the metal route that traverses the array of memory bit cells has a length that is less than a length of the given word line that traverses the array of memory bit cells.

15. A computing system comprising:
a memory comprising:
an array of memory bit cells arranged as a plurality of rows and a plurality of columns, each configured to store data; and
a plurality of word line driver circuits, each configured to generate a corresponding word line for the plurality of rows of the array of memory bit cells; and
an underdrive circuit coupled to the plurality of word line driver circuits configured to adjust, via a configurable resistor-capacitor circuit, a rate of change in a voltage level of a given word line generated by a given word line driver circuit of the plurality of word line driver circuits; and
a processor configured to generate memory access requests targeting data stored in the memory.

16. The computing system as recited in claim 15, wherein one or more of the plurality of word line driver circuits comprises a p-type transistor comprising:
a source terminal connected to a corresponding word line;
a gate terminal configured to receive an analog bias input signal; and
a drain terminal connected to an end of a capacitor of the configurable resistor-capacitor circuit of the underdrive circuit.

17. The computing system as recited in claim 15, wherein one or more of the plurality of word line driver circuits comprises a p-type transistor comprising:
a source terminal connected to a corresponding word line;
a gate terminal configured to receive an inverted value of the corresponding word line; and
a drain terminal connected to the configurable resistor-capacitor circuit of the underdrive circuit.

18. The computing system as recited in claim 17, wherein the underdrive circuit is further configured to disconnect a capacitor of the configurable resistor-capacitor circuit during accesses of the array of memory bit cells.

19. The computing system as recited in claim 15, wherein the underdrive circuit is further configured to discharge a capacitor of the configurable resistor-capacitor circuit between accesses of the array of memory bit cells.

20. The computing system as recited in claim 19, wherein the underdrive circuit is further configured to disable, via a word line clock signal during an access of the array of memory bit cells, an n-type pulldown transistor utilized to discharge the capacitor.

* * * * *